US012173800B2

(12) United States Patent
Rasmussen et al.

(10) Patent No.: US 12,173,800 B2
(45) Date of Patent: Dec. 24, 2024

(54) THROUGH-HARDENED VALVE SEAT FOR HYDRAULIC FRACTURING

(71) Applicant: Alpha 3D LLC, Verona, WI (US)

(72) Inventors: Erik Rasmussen, Hayward, WI (US); Steven J. Metz, Oshkosh, WI (US)

(73) Assignee: Alpha 3D LLC, Verona, WI (US)

( * ) Notice: Subject to any disclaimer, the term of this patent is extended or adjusted under 35 U.S.C. 154(b) by 504 days.

(21) Appl. No.: 16/725,238

(22) Filed: Dec. 23, 2019

(65) Prior Publication Data

US 2020/0217424 A1 Jul. 9, 2020

Related U.S. Application Data

(60) Provisional application No. 62/788,319, filed on Jan. 4, 2019.

(51) Int. Cl.
| | |
|---|---|
| *F16K 1/42* | (2006.01) |
| *E21B 43/26* | (2006.01) |
| *F04B 7/00* | (2006.01) |
| *F04B 7/02* | (2006.01) |

(52) U.S. Cl.
CPC ............... *F16K 1/42* (2013.01); *E21B 43/26* (2013.01); *F04B 7/0088* (2013.01); *F04B 7/0266* (2013.01)

(58) Field of Classification Search
CPC ........ F16K 1/42; F16K 15/028; F16K 25/005; E21B 43/26; F04B 7/0088; F04B 7/0266; F04B 53/1087; F04B 15/02; F04B 53/127; F04B 53/22; F04B 23/06
See application file for complete search history.

(56) References Cited

U.S. PATENT DOCUMENTS

| | | | | |
|---|---|---|---|---|
| 1,784,865 A | * | 12/1930 | Fahrenwald | C21D 7/04 29/90.01 |
| 2,768,918 A | | 10/1956 | Armstrong | |
| 5,052,435 A | * | 10/1991 | Crudup | F16K 15/063 251/332 |
| 9,631,739 B2 | * | 4/2017 | Belshan | F04B 53/1087 |
| 10,344,757 B1 | * | 7/2019 | Stark | F16K 25/005 |
| 2002/0096217 A1 | * | 7/2002 | Wu | F16K 15/028 137/543.19 |
| 2005/0098664 A1 | * | 5/2005 | Catasus-Servia | F02M 61/166 239/585.4 |
| 2009/0278069 A1 | * | 11/2009 | Blanco | F16K 15/063 251/317 |
| 2011/0079302 A1 | * | 4/2011 | Hawes | F16K 1/465 137/538 |

(Continued)

FOREIGN PATENT DOCUMENTS

| | | |
|---|---|---|
| JP | 2010276036 A | 12/2010 |
| KR | 20140001617 A | 1/2014 |

OTHER PUBLICATIONS

PCT International Search Report for PCT/US2019/068333.

*Primary Examiner* — Charles G Freay
*Assistant Examiner* — Lilya Pekarskaya
(74) *Attorney, Agent, or Firm* — Boyle Fredrickson, S.C.

(57) ABSTRACT

A valve seat for hydraulic fracturing valves employs a through-hardening process, for example, with austempering, to provide greater wear resistance at the interface between the valve seat and the valve plug as well as resistance to abrasion and leakage in the interface between an alignment ring of the valve seat and a bore in the pump body.

9 Claims, 2 Drawing Sheets

(56) References Cited

U.S. PATENT DOCUMENTS

| | | | |
|---|---|---|---|
| 2013/0020521 A1* | 1/2013 | Byrne | F16K 15/063 |
| | | | 251/359 |
| 2013/0202457 A1 | 8/2013 | Bayyouk et al. | |
| 2014/0070137 A1 | 3/2014 | Blume | |
| 2015/0144826 A1* | 5/2015 | Bayyouk | F04B 53/1087 |
| | | | 251/359 |
| 2017/0002947 A1* | 1/2017 | Bayyouk | F16K 17/162 |
| 2018/0073653 A1 | 3/2018 | Bayyouk et al. | |
| 2019/0040966 A1* | 2/2019 | Myers | F16K 15/026 |

\* cited by examiner

THROUGH-HARDENED VALVE SEAT FOR HYDRAULIC FRACTURING

CROSS REFERENCE TO RELATED APPLICATION

This application claims the benefit of U.S. provisional application 62/788,319 filed Jan. 4, 2019, and hereby incorporated by reference.

BACKGROUND OF THE INVENTION

The present invention relates generally to valves used in oilfield hydraulic fracturing (fracking) and subject to high pressures and abrasive liquids and in particular to a valve seat for such a valve providing improved longevity.

Hydraulic fracturing has provided enhanced recovery of oil and gas from underground reservoirs. In the hydraulic fracturing process, cracks in the reservoir matrix are produced by introducing a high-pressure fluid into the reservoir together with particulate matter (proppant), the latter of which infiltrates the cracks and props them open when the hydraulic pressure is removed. The open cracks promote flow of oil through the rock formation to a well shaft where the oil can be extracted.

The pumps introducing the high-pressure fluid into the reservoir employ a "fluid end" providing a pump housing holding a suction valve and discharge valve. The valves each provide a valve plug which engages a valve seat to control the flow of the hydraulic pressure fluid during a pumping cycle. Typically, the valve plug includes an elastomeric seal that compresses against the valve seat to prevent flow through the valve.

The valve seats are subject to wear from the high-pressure hydraulic fluid and the proppant and periodically need to be replaced, a process that can be time-consuming and expensive in terms of production and labor. For this reason, is known to treat the wear surfaces to provide surface hardening also termed case hardening. Generally surface hardening treats the surface of the valve seat to create a harder but typically more brittle surface. Potential cracking of the brittle surface under the forces associated with valve operation is avoided by supporting this thin, hardened surface on the ductile and thus tougher substrate of the un-hardened portions of the valve seat. Combining both the hardened and the unhardened materials provides the benefits of both types of strength: a hardened surface material to resist abrasion and a ductal substrate material to absorb stresses while resisting fracturing.

Even with surface treatment, the service life of the valve seat can be unacceptably short. For this reason, investigations have been made in bonding a separate hardened material such as carbide or ceramic to the valve seat surface. A discussion of the prior art is available in US patent publication 2014/0070127 hereby incorporated by reference.

SUMMARY OF THE INVENTION

The present invention provides a valve seat providing improved wear resistance by a through-hardening (as opposed to a surface hardening). The present inventor has determined that in the application of a valve seat, the increased brittleness of through-hardening can be accommodated in the supported structure of a valve seat and provides substantially increased wear life. in one embodiment, a carbon steel is through-tempered, for example, using austempering. This process provides a material that exhibits the necessary toughness in the valve seat (ductility) with hardening that improves wear resistance in hydraulic fracturing operations.

More specifically, in one embodiment, the invention provides a valve seat for hydraulic fracturing pumps having a metal ring with a central axial bore. The metal ring includes an upper header portion communicating with a coaxial lower alignment sleeve at a radially extending rim passing outward from an upper edge of the alignment sleeve to a lower edge of the header portion. An exposed upper face of the header portion presents an inwardly downward bevel for receipt of a valve plug. The metal ring is a through-hardened steel of substantially uniform composition to a depth of at least one-half inch from its outer surfaces.

It is thus a feature of at least one embodiment of the invention to provide a more robust wear surface by through-hardening the valve seat. The present inventors have recognized that such through-hardening can be accomplished without increasing the tendency of the ring to fracture in this application.

The metal ring may be an austempered steel.

It is thus a feature of at least one embodiment of the invention to provide a hardening technique that can be performed after dimensional machining without adversely affecting the precision of the part.

The metal ring may be through-hardened to a Rockwell C hardness of greater than 45 and less than 70.

It is thus a feature of at least one embodiment of the invention to provide substantial hardening of the valve seat.

The steel may have a carbon percentage of greater than 0.6 and/or a chromium percentage greater than 1.30. In one embodiment the steel may be a 52100 alloy.

It is thus a feature of at least one embodiment of the invention to provide a steel material that is amenable to the necessary hardening techniques.

These particular objects and advantages may apply to only some embodiments falling within the claims and thus do not define the scope of the invention.

DETAILED DESCRIPTION OF THE PREFERRED EMBODIMENT

Figure 1:
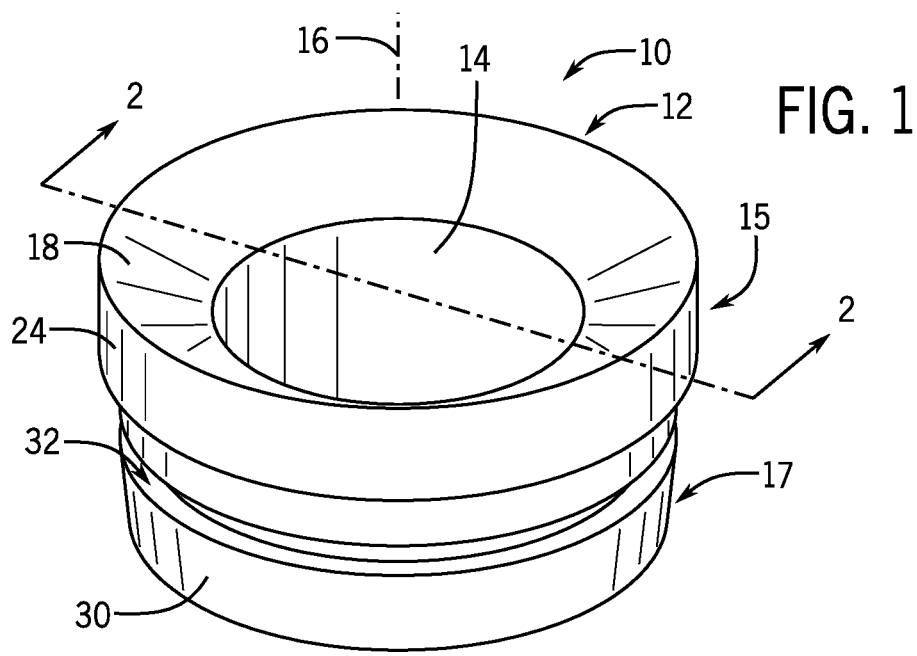
FIG. 1 is a perspective view of a valve seat according to one embodiment of the present invention showing the valve seat surface and body.

Referring now to FIG. 1, a valve seat 10 for use in fracking may provide for a generally cylindrical ring 12 constructed of a single piece of steel of substantially uniform composition and having a cylindrical bore 14 centered along fluid flow axis 16. The ring 12 provides an upper header portion 15 having a substantially cylindrical outer periphery joined to a lower coaxial alignment sleeve 17 of lesser diameter. The interface between the upper header portion 15 and the lower coaxial alignment ring provides a radially extending rim 19 passing inwardly from a lower edge of the upper header portion 15 to join to the upper edge of the alignment sleeve 17.

In example dimensions, the upper header portion 15 will have a diameter of substantially 5.197 inches and the height of the metal ring 12 measured along the axis 16 will be substantially 2.59 inches. The bore may have a diameter of substantially 3.26 inches.

The cylindrical bore 14 broadens at its upper edge to an outwardly extending flare of upwardly facing valve surface 18. Valve surface 18 thus slopes inwardly downward toward the fluid flow axis 16 to define an apex-downward conical surface 21 having an apex angle 23 of approximately 120 degrees plus or minus one half degree. The valve surface 18 at any given location on that surface 18 has an angle with respect to the axis 16 of approximately 60°. As noted above, this valve surface 18 is subject to substantial wear during the flow of hydraulic fluid and proppant 22 there past.

The outermost edge of the valve surface 18 terminates at a downwardly extending vertical wall 24 of the upper header portion 15. This vertical wall 24 will engage in a similarly sized counterbore in the pump housing discussed below. Below the upper header portion 15, the alignment sleeve 17 provides a vertically extending sidewall 30 broken midway by a circumferential notch 32 that may receive an O-ring 33 for sealing the valve seat 10 within a similarly sized bore in the pump housing.

The sidewall 30 tapers downwardly inward to define a frustoconical outer surface conforming to a portion of an apex-downward cone 34 having an apex angle 36 of substantially 7.16 degrees. More generally, the sidewall 30 provides a tapering at an angle of $3.58°\pm0.5°$ with respect to the axis 16. Deviations in this sidewall 30 can create paths for the high-pressure fluid to pass around the valve seat creating extensive damaging erosion that is important to avoid. For this reason, this taper must be accurately formed. Normally this is done by machining a case hardened valve seat after hardening, and that may be done in this case of through-hardening as well. However, the present inventors believe that the dimensional predictability of the hardening process described herein allows outer surfaces of the cylindrical ring 12 may be machined first and then hardened as will now be discussed.

Rather than the surface hardening, the valve seat 10 of the present invention is subject to a heat treatment process that changes the structure of material throughout the valve seat 10. In this regard, the valve seat 10 may be initially fabricated (before the tempering process) by conventional machining techniques from a carbon steel and preferably from a high carbon alloy steel. The carbon steel preferably is a high carbon steel having a carbon content of greater than 0.6% by weight and may be a silicon alloy. In one embodiment, the high carbon steel may be 52100 steel being, for example, a high carbon, chromium bearing steel with high-strength and fatigue properties. The 52100 steel alloy may have the following chemical analysis:

| Chemical Analysis Percent by Weight | |
| --- | --- |
| Carbon | 0.95-1.0 |
| Manganese | 0.25-0.45 |
| Phosphorus | 0.025 maximum |
| Sulfur | 0.025 maximum |
| Silicon | 0.20-0.35 |
| Chromium | 1.30-1.60 |
| Iron | Remainder |

Before tempering, the valve seat 10 is machined to smaller dimensions that are empirically determined to produce the desired end dimensions of the valve seat 10 in use and after an expansion during the tempering process which changes the dimension of the valve seat 10. Optionally, the valve seat 10 may be machined after tempering on critical surfaces, typically limited to the sidewalls 30.

The heat treatment process will heat the tempered blank to a high temperature (for example, between 790 and 915° C.) and then quench the blank using a salt bath quenching (or similar high-temperature quenching material) providing isothermic quenching at high temperatures (for example, at least 230° C.) and in one embodiment within a range of 260-370 C Typically, in the austempering process, the valve seat 10 will be brought to an austeinitization temperature (for example, between 790 and 915° C.) and then quenched for a controlled cooling rate and time, for example, in a salt or high temperature oil bath.

Preferably, the quenching process provides a sufficient quenching time (for example, 2 to 4 hours) to produce a bainite structure being a plate-like or acicular microstructure that can form in steels with the proper tempering regime. Ideally, the quenching process provides austempering in which the bainite structure produces very little distortion from the initial machined shape of the tempered valve seat 10, although the process may alternatively employ a marquenching or martempering.

Preferably, the tempering process changes the material uniformly throughout the cross-section of the valve seat 10 or to a depth of at least one-half and preferably three quarters of an inch inward from its outer exposed surfaces overcoming the problems inherent in superficial or case hardening which can wear or abrade away during use exposing softer ductal steel subject to faster erosion. Ideally the tempering process produces a final hardness of 53-56 Rockwell C and preferably greater than 45 Rockwell or within 50 Rockwell to 70 Rockwell After tempering, valve seat 10 is cooled. After cooling, the sidewalls 30 may be machined to dimension if necessary.

The austempering process may be contrasted to a hardening process that introduces carbon into the valve seat 10 which can cause substantial dimensional changes and distortion. When a bainite structure is produced during austempering, there is far less distortion than when a martinsitic structure is formed, the latter of which produces a crystal structure that more significantly changes the dimensions of the valve seat 10. The dimensional stability possible with the austempering process makes practical the use of machining offsets so that the small amount of distortion produced by the austempering brings the shape into its final desired dimensions without subsequent machining of the hardened material.

Figure 3:
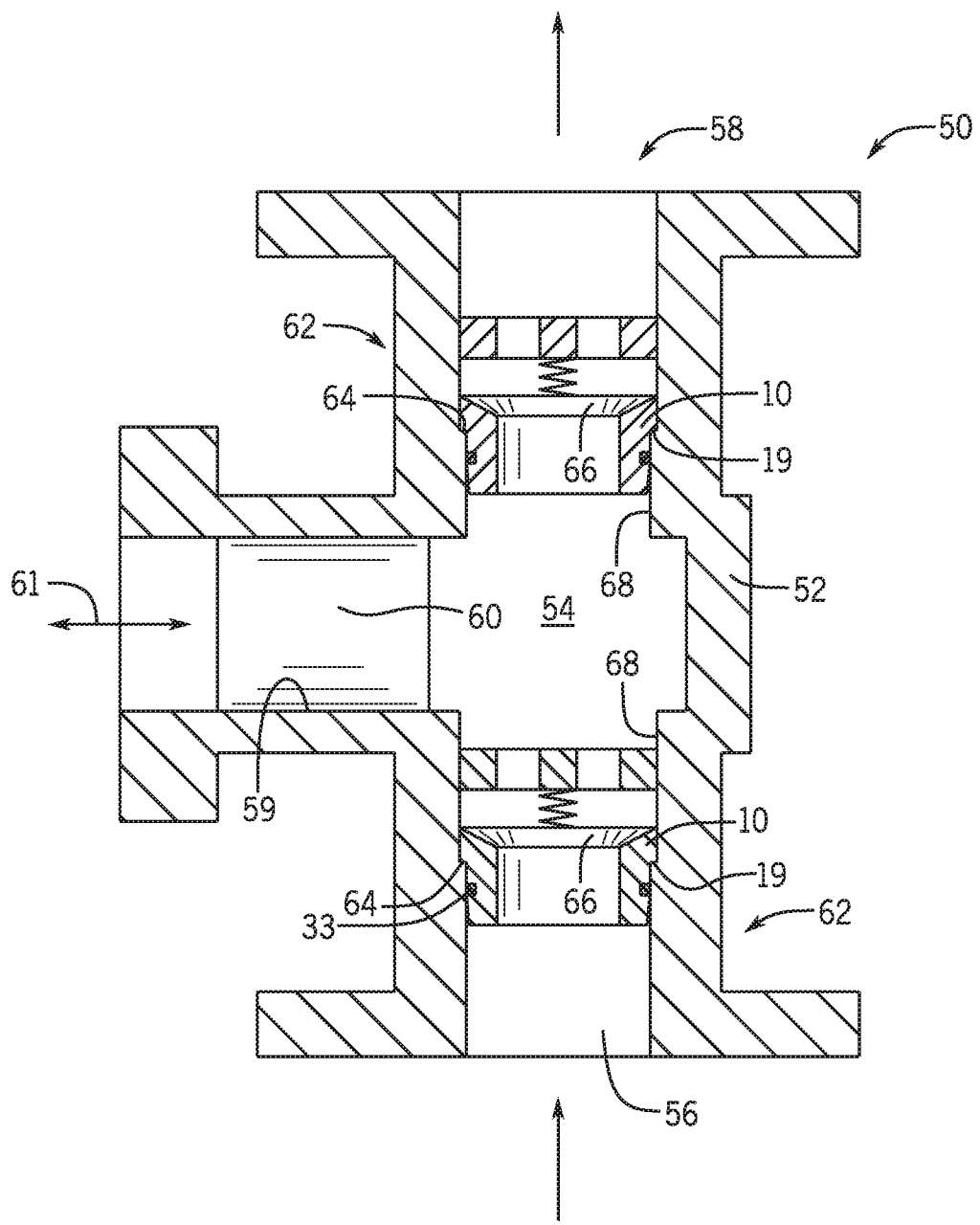
FIG. 3 is a partial cross-section of a pump incorporating the valve seat of FIG. 1.

Referring now to FIG. 3, the above-described valve seat 10 may be incorporated into a pump 50 providing a pump body 52 defining a pump volume 54. The pump volume 54 may communicate with each an inlet 56 and outlet 58 and a plunger chamber 59. The plunger chamber 59 receives a plunger 60 which is subject to reciprocating motion 61 (for example, by an external motor or the like) to change the pump volume 54 to successively draw liquid into the pump volume 54 through the inlet 56 and expel liquid from the pump volume 54 through the outlet 58. Positioned within the inlet 56 and outlet 58 are one-way valves 62 employing the valve seats 10 and spring-loaded valve plugs 66 having a taper corresponding to the valve surface 18 to abut the surface 18 when the valve is closed for tight inter-fitting therewith to block fluid flow.

Figure 2:
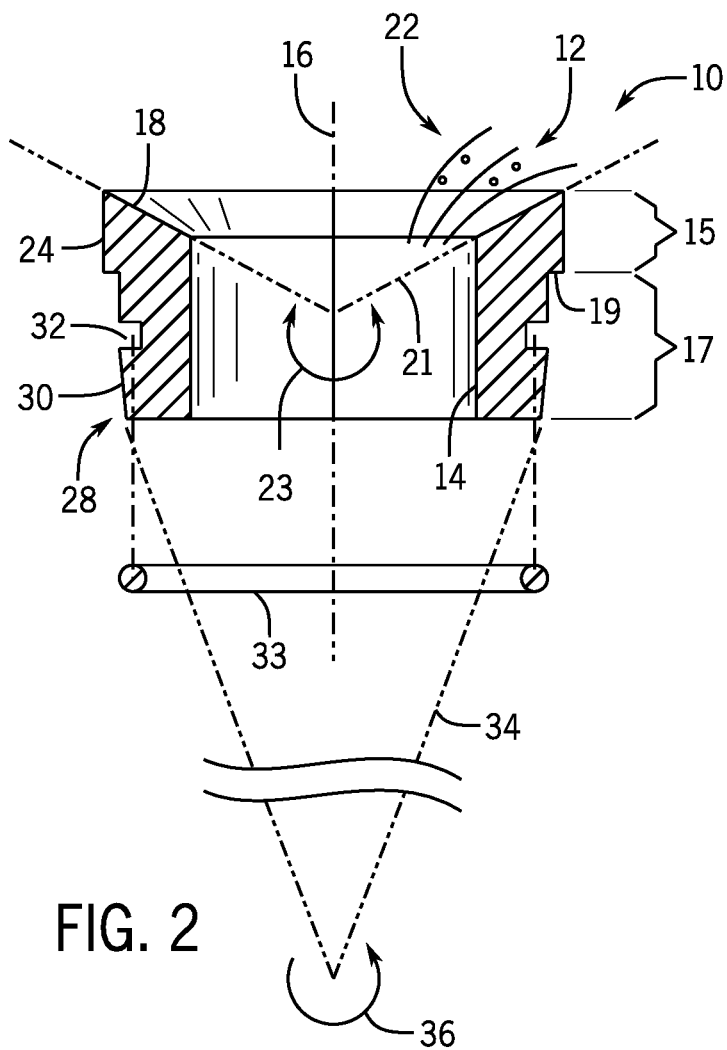
FIG. 2 is an elevational cross-section taken along lines 2-2 of FIG. 1.

Referring also to FIG. 2, the valve seats 10 are held against movement with respect to the pump body 52 by inter-fitting of the rims 19 with corresponding ledges 64 in the inner walls of the inlet 56 and outlet 58. The alignment sleeve 17 fits within a correspondingly tapered bore 68 of the pump body to provide a tight seal therewith further enhanced by the O-ring 33. The hardening of the sidewall 30 is believed to substantially decrease valve wear caused by low levels of leakage past the valve seat 10 such as may promote valve failure.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A method of forming a valve seat for hydraulic fracturing pumps comprising: a metal ring providing a central axial bore, the metal ring having an upper header portion communicating with a coaxial lower alignment sleeve at a radially extending rim passing outward from an upper edge of the coaxial lower alignment sleeve to a lower edge of the upper header portion; and an exposed upper face of the upper header portion of that is presenting an inwardly downward bevel for receiving a valve plug;

wherein the metal ring is formed by a process of machining a high carbon alloy steel having a carbon content percentage of greater than 0.6 percent by weight and a chromium content percentage greater than 0.7 percent by weight in the metal ring, and then being formed by a process of through hardening by austempering to provide a through-hardened carbon alloy steel of substantially uniform composition to a depth of at least one-half inch from outer surfaces of the metal ring.

2. The method of claim 1, wherein the metal ring is through-hardened to a Rockwell C hardness of greater than 45 and less than 70.

3. The method of claim 2, wherein the metal ring is through-hardened to a Rockwell C hardness within a range of 53-59.

4. The method of claim 3, wherein the through-hardened carbon alloy steel of the metal ring is a 52100 alloy steel.

5. The method of claim 1, wherein the inwardly downward bevel defines an apex-downward cone having an apex angle of greater than 110 degrees and less than 130 degrees.

6. The method of claim 1, wherein the coaxial lower alignment sleeve has a frustoconical outer surface tapering downward.

7. The method of claim 1, wherein the coaxial lower alignment sleeve has a radially inwardly extending groove positioned below the rim for receipt of an O-ring.

8. The method of claim 7, further including an O-ring fitting within the radially inwardly extending groove.

9. The method of claim 1, wherein the metal ring fits within a coaxially aligned cylindrical volume that is three inches tall and six inches in diameter, and wherein the central axial bore is sized to define a second coaxially aligned cylindrical volume having a three-inch diameter and three-inch height.

* * * * *